Sept. 14, 1926.  1,599,679
G. SCHROEDER
DYNAMO ELECTRIC MACHINE
Filed Sept. 9, 1924     2 Sheets-Sheet 1
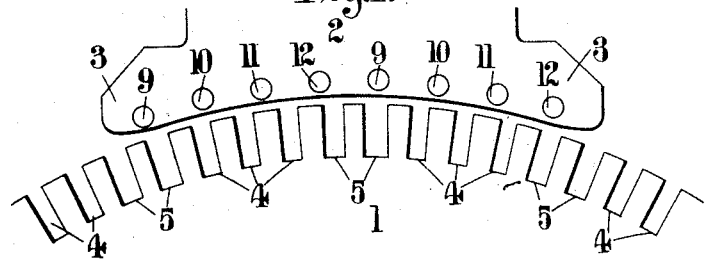
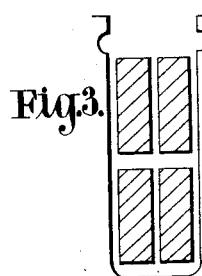 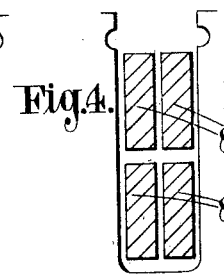 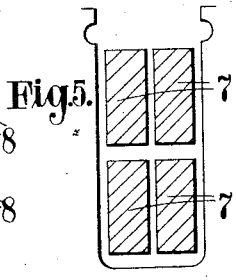

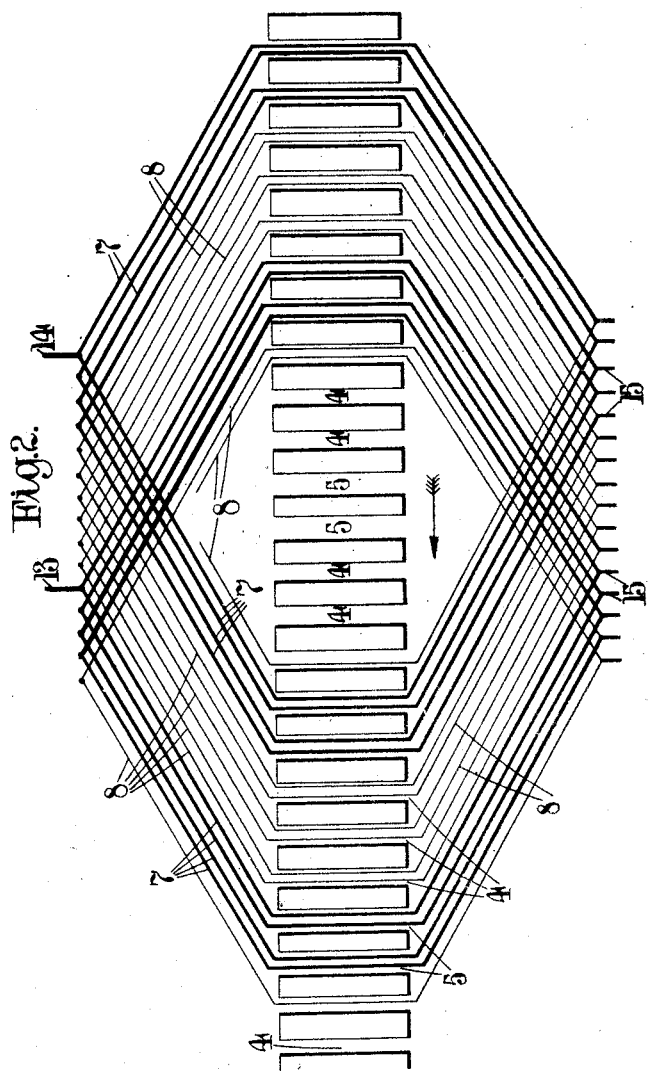

Patented Sept. 14, 1926.

1,599,679

UNITED STATES PATENT OFFICE.

GIULIO SCHROEDER, OF WEST BYFLEET, ENGLAND, ASSIGNOR TO THE ENGLISH ELECTRIC COMPANY LIMITED, OF LONDON, ENGLAND, A BRITISH COMPANY.

DYNAMO-ELECTRIC MACHINE.

Application filed September 9, 1924, Serial No. 736,723, and in Great Britain September 19, 1923.

In certain types of dynamo electric machines having a winding distributed around the periphery of one element of the machine there exists the characteristic that, although the winding may be uniformly distributed, the current flowing therein is not uniform, being of a higher value in certain parts of the winding than in others. This want of uniformity is, in general, due to the fact that the winding carries two or more component currents differing in value or kind, this difference, in conjunction with the methods of leading the currents into and out of the windings having the effect of producing resultant currents of high values in certain parts of the winding and low values in other parts.

An example of a machine element having the features above indicated is found in the armature of a synchronous rotary converter. In this case the turns of the winding adjacent to the tappings by which the alternating current circuits are connected with the armature carry heavier currents than the parts more remote from these points.

A result of this non-uniform distribution of current is the production of non-uniform heating of the machine, the output of which is of course limited by the temperature rise of the hottest point so that the output is lower for the generation of a given amount of heat in the case where this is distributed non-uniformly than in the case where an approximately uniform distribution exists. It is the object of the present invention to effect an improvement in the armature of a synchronous rotary converter by which the distribution of the heating is rendered more uniform. This improvement consists in arranging that the section of the conductor is varied from point to point around the core so that the greater section occurs where the higher effective current values are found whereby the resistance loss taking place in the different conductors is rendered more uniform. This grading of the section of the conductor with appropriate changes in the dimensions of the slots in cases where the winding is arranged in slots, will generally be done in steps in order to comply with practical requirements, the number of steps being limited by considerations of the relative advantage and cost of obtaining a more or less close approximation to uniform distribution of resistance losses.

Where this method of grading the section of the conductor is employed in connection with rotary converters having the armature winding arranged in slots of constant depth distributed around the core, the width of the slots will in general be varied in accordance with the grading of the conductor. In practice this may be carried out in two ways. In the one of these, particularly described hereinafter, the pitch of the slots is as usual kept constant in value at all points on the core. In the other arrangement, which is dealt with in the application of Barnes Serial No. 736,736, filed September 9, 1924, the pitch of the slots is varied from point to point around the core. The first arrangement has the effect of introducing a periodic variation in the reluctance of the path for the flux through any particular portion of a pole face as the armature moves past that region. For instance, in the case of a six phase rotary converter, the period of the variation in the local reluctance will be equal to one-third of the time occupied by the passage of any point on the periphery of the armature through a pole pitch. With such machines where short circuited windings are arranged on the pole faces for the purpose of damping or starting, it is necessary to take into consideration the presence of the disturbance in the flux produced by this periodic change of reluctance. Accordingly a further object of this invention is to provide that the pole face winding is practically non-inductive to the flux pulsations produced in the manner indicated. This is effected by dividing the pole face windings into a series of independent short circuited sections, any one of which contains only conductors which are so spaced on the pole face as to be non-inductively related to the periodic disturbance.

The invention will now be described by way of example with reference to Figures 1 to 5 of the accompanying drawings. Figure 1 shows diagrammatically an end view of a part of the slotted circumference of the armature of a six pole synchronous rotary converter without any winding and one pole and pole shoe of the associated field system with a damping winding situated in the pole shoe. Figure 2 shows a developed circumferential view of some of the armature slots as well as several armature coils placed in position therein. Figure 3 is a sectional view of one of the armature slots of a rotary converter not provided with a graded winding. Four conductors are shown in the slot. Figures 4 and 5 show by comparison similar views of two slots and their associated conductors suitable for use in the armature of the same rotary converter after providing it with a graded armature winding arranged as in Figures 1 and 2.

In Figures 1 and 2 the 6-pole armature is denoted by 1 and it has fifteen slots per pole. One of the six poles is denoted by 2 having a pole shoe 3 in which a suitable damping winding is arranged. The ninety armature slots are arranged around the armature circumference in eighteen groups of five slots per group (each group occupying sixty electrical degrees of the armature circumference) and three of each five are narrow slots 4 and two are wide slots 5. The armature winding scheme will be clear from an examination of Figure 2 wherein the wide conductors 7, shown by heavy lines, are arranged in the wide slots 5 (this arrangement corresponds to Figure 5) and the narrow conductors 8, shown by light lines, are arranged in the narrow slots 4 (corresponding to Figure 4). The wide conductors 7 are tapped at points 13 and 14 etc. at intervals of sixty electrical degrees around the winding and connected to six slip rings in the usual manner. The particular points at which the wide conductors are tapped depend upon the power factor, but with a leading power factor which is the usual case in practice and with the type of winding shown those conductors which carry the largest currents in Figure 2 are those which lie in the direction of rotation of the armature from the tapping points. This is why most of the wide conductors are shown in Figure 2 to the left of the tapping points, it being assumed that the armature rotates in the direction of the arrow. The tappings 15 go in usual manner to the commutator segments.

In Figures 1 and 2 it will be observed that the pitch length is the same between the centre lines of any adjacent slots and this as previously mentioned gives rise to a periodic variation in the reluctance of the path for the flux through any particular portion of a pole face as the armature moves past that region. To counteract the effect of this varying reluctance four independent short circuited squirrel cage windings are arranged in each pole shoe 3 and each of these windings has a pitch which causes it to be non-inductively related to the periodic disturbance or in other words such that the reluctance of the whole magnetic path through each winding remains invariable. Thus in Figure 1 the two bars 9, spaced apart sixty electrical degrees, together with end connectors (not shown) form one of the squirrel cage windings and similarly the pairs of bars 10, 11 and 12 and their end connectors (not shown) form the three other squirrel cage windings.

What I claim as my invention and desire to secure by Letters Patent is:—

1. In a synchronous rotary converter an armature winding having connectors leading to commutator segments and serving for the passage of direct current and having tappings for the passage of alternating currents, the section of the conductors of which the armature winding is formed being varied from point to point in the winding in such a way that the greater section is found near the points at which the tappings for the alternating currents are located where the higher effective current values exist.

2. In a synchronous rotary converter, an armature comprising a slotted core, a winding in said slots having connectors leading to commutator segments and serving for the passage of direct current and having tappings for the passage of alternating currents, the section of the conductors of which the armature winding is formed being varied from point to point in the winding in such a way that the greater section is found near the points at which the tappings for the alternating currents are located where the higher effective current values exist, the slots in the core being of varying width so as to accommodate the varying section of the winding.

3. In a synchronous rotary converter, an armature comprising a slotted core having slots of constant pitch and of at least two different widths arranged in recurring similar groups and a winding formed of conductors of at least two different widths disposed in said slots.

4. A synchronous rotary converter comprising an armature having a slotted core with slots of uniform pitch but different widths disposed in similar recurring groups uniformly spaced around the core, a field structure, short circuited windings carried by the face of the field structure and consisting of independent sets of bars and separate end connections associated with each of said sets and spaced on the face of the field structure so as to be non-inductively related to the periodic disturbance of flux produced by the variation in the width of the slots.

5. A polyphase synchronous rotary converter comprising an armature having a slotted core with slots of uniform pitch but different width arranged in similar recurring groups, the recurrence taking place at distances along the periphery of the core equal to a pole pitch divided by half the number of phases of the alternating current side of the converter, a field structure, short circuited windings carried by the face of said field structure and consisting of independent sets of bars and separate end connections associated with each of said sets, the bars in any one set being spaced apart from each other by a distance equal to the pole pitch divided by half the number of phases of the alternating current.

In testimony whereof I affix my signature.

GIULIO SCHROEDER.